United States Patent [19]

Kiss

[11] 4,075,146

[45] Feb. 21, 1978

[54] STABILIZED POLYOLEFIN COMPOSITIONS

[75] Inventor: Kornel Dezso Kiss, Yonkers, N.Y.

[73] Assignee: Dart Industries, Inc., Los Angeles, Calif.

[21] Appl. No.: 645,982

[22] Filed: Jan. 2, 1976

[51] Int. Cl.$^2$ .......................... C08K 5/09; C08K 5/10; C08K 5/25

[52] U.S. Cl. ........................ 260/23 H; 260/45.85 B; 260/45.85 N; 260/45.85 P; 260/45.9 NN

[58] Field of Search ....... 260/23 H, 45.85 B, 45.85 N, 260/45.85 P, 45.9 NN

[56] References Cited

U.S. PATENT DOCUMENTS

| | | | |
|---|---|---|---|
| 3,280,069 | 10/1966 | Knapp et al. ................... | 260/45.85 P |
| 3,285,855 | 11/1966 | Dexter et al. ........................... | 252/57 |
| 3,660,438 | 5/1972 | Dexter et al. ...................... | 260/404.5 |
| 3,673,152 | 6/1972 | Minagawa et al. ........... | 260/23 H X |
| 3,772,245 | 11/1973 | Dexter ............................ | 260/45.85 S |
| 3,943,106 | 3/1976 | Schmidt et al. ................ | 260/45.85 B |
| 3,954,708 | 5/1976 | Rasberger et al. ............. | 260/45.85 B |
| 4,000,101 | 12/1976 | McNally ............................. | 260/23 H |

*Primary Examiner*—Sandra M. Person
*Attorney, Agent, or Firm*—Margareta LeMaire; Bryant W. Brennan; Fred S. Valles

[57] ABSTRACT

A polyolefin composition having excellent stability against degradation caused by exposure to heat and oxygen in the presence of copper, which composition is stabilized with a synergistic stabilizer system containing at least one phenolic antioxidant and calcium stearate.

11 Claims, No Drawings

STABILIZED POLYOLEFIN COMPOSITIONS

BACKGROUND OF THE INVENTION

This invention relates to polyolefin compositions having a stability against degradation caused by exposure to heat and oxygen. Specifically it relates to a synergistic combination of stabilizers which make the compositions ideally suited as insulation for underground electrical cables.

It is well known in the art to stabilize polymers against degradation due to heat and oxidation by incorporating into the polymers a stabilizing amount of hindered phenolic antioxidants such as those disclosed in U.S. Pat. No. 3,285,855. However a serious disadvantage to the use of plastic materials such as polyolefin resins, as insulation for wire and cables is the fact that the degradation of the polymer is accelerated by the presence of copper and alloys of copper. Prior art methods to solve this problem have resulted in a combination of the polyolefin resins with the primary hindered phenolic antioxidant and a copper deactivator or chelating agent such as certain organic hydrazide or hydrazine compounds, e.g., those disclosed in U.S. Pat. Nos. 3,438,935, 3,484,285 and 3,772,245.

It is also well known in the prior art that the stabilizing efficiency is improved by the addition of synergists such as dilauryl thiodipropionate (DLTDP) or distearylthiodipropionate (DSTDP). In summary, in order to produce a polyolefin based resin composition which is acceptable for use in coating of cables, wires and other electrically conducting devices made from copper or copper alloys it is necessary to incorporate in said resin the aforementioned three-component system of antioxidant-chelating agent-synergist. As each of these components are relatively high cost materials and usually added in appreciable quantities, the resultant polyolefin resin compositions have often been deemed not economically feasible for such uses.

It is therefore an object of the present invention to provide a novel stabilized polyolefin resin composition useful as insulation for wire and cables.

It is another object of the present invention to provide a polyolefin resin composition when in direct contact with copper exhibits excellent stability against oxidative and thermal degradation.

It is a further object of the invention to provide a stabilized polyolefin resin composition, wherein one of the components of the stabilizer system functions simultaneously as a synergist and a metal chelating agent.

Other objects of the invention will become apparent from the detailed description and appended claims.

THE INVENTION

In accordance with the present invention there is provided a polyolefin resin composition stabilized with
 (a) a stabilizing amount of phenolic antioxidant and
 (b) at least 100 ppm calcium stearate based on the weight of the polyolefin resin.

The polyolefin resin component of the composition of this invention comprises solid, substantially crystalline polyolefins including homopolymers and copolymers of α-olefins having 2 to 8 carbon atoms and blends thereof. Among the preferred polyolefins are the polypropylene based resins containing at least 60 percent by weight preferably at least 75 percent polymerized propylene groups. Especially preferred resins are the ethylene-propylene polymer resins, such as random or block copolymers of ethylene and propylene, blends of homopolymers of propylene and ethylene, and various combinations thereof, wherein the ethylene in either homo- or copolymerized state accounts for from about 2 to about 25 percent by weight of the total resin and more preferably from about 3 to about 15 percent.

The phenolic antioxidant is selected from at least one of the compounds of the following two groups:

(I) Mono-and polyesters of alkane polyols, at least one of such ester groups comprising the acyl moiety:

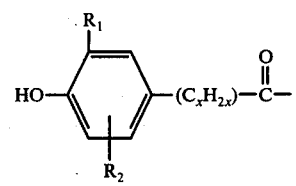

in which $R_1$ and $R_2$ independently are a lower alkyl group containing 1 to 5 carbon atoms, and $x$ has a value of from 1 to 6 and preferably 2. The preferred lower alkyl groups are the tertiary alkyls in the 3,5 positions of the phenyl moiety. Each of the remaining hydroxyl groups of the alkane polyol may be unesterified, esterified by the said acyl group, or esterified by alkanoyl groups of from 1 to 20 carbon atoms. The preferred phenolic antioxidants are those which are fully esterified with the aforementioned acyl groups. Specific alkane polyols include ethylene glycol; 1,2-propanediol; 1,3-propanediol; 1,4-butanediol; 1,6-hexanediol; 1,2-octanediol; 1,7-heptanediol; 1,2,3-butanetriol; glycerol; neopentyl glycol; erythritol; pentaerythritol; sorbitol; 2,5-hexanediol; 1,1,1-trimethylolpropane; and 2,2,4-trimethyl-1,3pentanediol and the like. All of these compounds are known, see, e.g., the aforementioned U.S. Pat. No. 3,285,855 incorporated herein by reference;

(II) Phenolic hydrazines having the formula

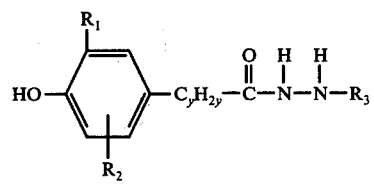

in which $R_1$ and $R_2$ are defined as above, $y$ has a value from 0 to 6, $R_3$ is hydrogen, an alkanoyl group containing 2 to 18 carbon atoms, a group represented by the formula

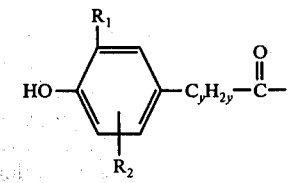

or an aroyl group having the formula

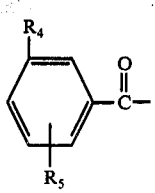

wherein $R_4$ and $R_5$ are independently hydrogen, alkyl, alkoxy or halogen where the alkyl group has up to 18 carbon atoms. A preferred acyl moiety of the compounds within this group is as described in reference to the phenolic antioxidants of group (I) i.e. when $R_1$ and $R_2$ are tertiary alkyls in the 3,5 positions of the phenyl group and $y$ has a value of 2. Also the diacyl hydrazines are preferred over the mono-acyl hydrazines. All of these compounds and their preparation are well known, see., e.g., U.S. Pat. Nos. 3,660,438 and 3,772,245 incorporated in this application by reference.

The aforementioned phenolic antioxidant stabilizer is added to the polyolefin resin in stabilizing quantities such as 0.01 to 10 percent based on the weight of the polyolefin resin, preferably in 0.1 to 2 percent concentrations and most preferably in 0.2 to 1 percent concentrations.

The calcium stearate component is incorporated into the resin in an amount of from about 100 ppm to about 5000 ppm based on the polyolefin resin and preferably the concentration is maintained between about 100 and about 500 ppm.

It was surprisingly found that in polyolefin resins in direct contact with copper the calcium stearate would act as a synergist in combination with the phenolic antioxidant components of the present invention. Moreover the inclusion of calcium stearate on the average increases the stability by a factor of 2-3 or even higher, when measured by several tests described hereinafter. This is comparable or even better than is achieved by the known thioester synergists such as DLTDP and DSTDP. The results are even more remarkable in that much smaller quantities are needed with the calcium stearate than with the thioesters to achieve significant synergism. Since calcium stearate is considerably less expensive than the thioesters, it follows that the use of calcium stearate in the compositions of this invention represents a significant economical gain.

Also, equally important, it was found that if so desired there is no need to include a metal chelating agent into the composition to counteract the detrimental effect of copper on the stability of the resin. This became quite apparent in systematic investigations of the effect of the calcium stearate in polyolefin compositions stabilized with (a) a phenolic antioxidant belonging to group I, (b) a phenolic hydrazine compound of group II, which compound acts as a combined antioxidant-chelating agent, and (c) with a mixture of said compounds. Specifically, it was determined that at the same total concentration of additives including the calcium stearate, the resistance of the resin to heat and oxidation containing stabilizer systems of the group I phenolic antioxidant and calcium stearate were consistently and significantly better than the resistance obtained with the three-component systems, i.e., those also containing a phenolic hydrazine compound of group II. It is not known, why this chelating effect occurs with calcium stearate, but one may postulate that the calcium stearate migrates to the copper-resin interface and thus prevents direct contact between the copper and resin and protects the latter from copper catalyzed degradation. It is obvious from the above, that considerable cost savings can be realized with the two-component stabilizer system of this invention as compared to conventional systems containing separate antioxidants and chelating agents. However, this is not to be construed as a limiting feature of the invention, since as discussed in detail above, the calcium stearate functions as a synergist in conventional systems.

In order to provide a better understanding of the invention reference is had to the Example, which includes a considerable number of comparative experiments.

EXAMPLE

In carrying out the indicated tests of the various compositions the procedures set forth below are followed.

A polypropylene copolymer containing about 12 weight percent ethylene, having a density of about 0.9, a melt index at 230° C. of about 3 gms./10 min. and containing at least about 96 percent heptane insolubles is blended with the amount of constituents indicated in Table I below in a Banbury type mixer. Constituent (A) is the pentaerythritol tetraester of 3(3,5-di-t-butyl, 4-hydroxyphenyl) propionic acid; constituent (B) is a N-N'-bis β(3,5-di-t-butyl, 4-hydroxy phenyl) propionyl hydrazine and constituent (C) is calcium stearate. Each of the blended samples is then compression molded into 6 × 6 inches 10 mil. plaques at 400° F. and 25,000 p.s.i.g. for 60 seconds. The plaques are rapidly cooled at high pressure, 1½ × 1½ inches × 10 mil. strips cut from the plaque, and tested using differential scanning calorimetry (DSC). This analysis provides an extremely effective method for obtaining accelerated aging data which can be extrapolated to periods of decades at ambient temperatures. The DSC test procedure is as follows.

A small sample of the 10 mil. film strip prepared in the compression mold having a diameter of approximately 0.25 inch is placed on a copper test pan in a duPont differential scanning calorimeter (DSC). The pan is then covered and heated from room temperature at a linear programmed rate of 10° C./min. in the presence of nitrogen flowing through the DSC at a rate of 0.08 cu. ft. per hour. When the temperature in the DSC reaches 200° C., the nitrogen is automatically stopped and oxygen flowing at the same rate is passed through the DSC. The temperature is maintained at 200° C. until the oxidation peak has occurred and the induction period is measured in minutes from the time the oxygen is added until the oxidative degradation occurs.

For long term heat aging tests (LTHA), the aforementioned plaques are cut into ½ × 2 inches × 10 mil. strips. Five strips of each of the controls and examples are placed on copper sheets and put into a Model 625A Freas forced draft oven at 150° C. The strips are checked periodically during the first day and then checked daily thereafter for signs of failure. The same procedure is repeated with another set of samples using a temperature of 160° C.

For measuring accelerated heat stability using a screen bending test (SBT) the following procedure is used. A polyolefin resin copper screen laminate 0.036 ± 0.002 inch thick consisting of polyolefin resin molded on both sides of a 60 × 60 mesh 0.0075 inch wire copper screen is prepared as follows: A 4 × 4 inch piece of screen is cut and dipped for a few moments in trichloroethane to remove any oil or grease present. The shim used for compression molding is 0.035 inch thick and the sample section is 6 × 6 inches. Of a total of 15-20 grams polyolefin pellets roughly one-half is placed in the mold first using mylar backing. The copper screen is placed in the center of the mold on top of the pellets followed by the remaining polyolefin pellets. The sample is then placed in a press at 400° F. and the pressure raised to 1000 lbs. for about 2 minutes, during which time melting occurs. As melting occurs, the press will have to be closed gradually to maintain the 1000 lbs. pressure. After melting appears to be complete (takes about 2 minutes), the pressure is raised to 15,000 lbs. for an additional minute. The pressure is then released and the sample is quench cooled in water. Thickness variation should be ± 0.002 inch. The specimens for the SBT test are cut from the laminate in 4 inch lengths, 0.25 inch width. Five test specimens are cut per sample. If the screen can be felt through laminate, the test specimen is replaced.

The test specimens are then hung vertically in a forced air circulating oven (fresh air vents set at $\frac{1}{8}$ to $\frac{1}{4}$) and aged for, e.g., 60 ± 1 minutes at 200° ± 2° C. The temperature of the oven must have recovered to 200° C within 10 minutes after the specimens have been put in the oven. The specimens are then removed and allowed to cool to room temperature. Each specimen strip is bent 180° in three different places about 1 inch apart using fingers to bend the strips. A specimen shall fail when visible cracks occur at any part of the section where the specimen has been bent. More than one crack in a specimen counts as one failure.

In general, a sample is considered acceptable, if at 1 hour of aging there are no failures in the five sample specimens or a maximum of 1 failure out of 10 sample specimens (i.e., 1 failure in the first five specimens, and 0 failures in a repeat testing of five new specimens cut from the same sample).

However, in order to get a more quantitative estimate of the time above which failure of the sample occurs, at least two tests are carried out at one hour time intervals to bracket the hourly interval $t_1$-$t_0$, in which $t_a$ is located. Thus, 0 failures are observed at time $t_0$ and $x\%$ failures at time $t_1$. Time $t_a$ is then $t_1$-$x/100$. For example, if there are 0 failures after 1 hour of aging and 45% failures after 2 hours, then the estimated time $t_a$ is (2-0.45) hours = 1.55 hours.

Table 1 below summarizes the pertinent test data from the comparative runs.

TABLE I
Effect of Additives on Stability

| Run No. | Additives, ppm A | B | C | Total | LTHA, hrs. 150° C | 160° C | DSC min. | SBT hrs. |
|---|---|---|---|---|---|---|---|---|
| 1 | 250 | | | 250 | 160 | 21 | 6 | .75 |
| 2 | | 250 | | 250 | 145 | 9 | 6 | .6 |
| 3 | | | 250 | 250 | <8 | <5 | <1 | <.1 |
| 4 | 500 | | | 500 | 205 | 39 | 7 | .75 |
| 5 | | 500 | | 500 | 175 | 12 | 6 | .5 |
| 6 | | | 500 | 500 | <8 | <5 | <1 | <.1 |
| 7 | 250 | 250 | | 500 | 170 | 23 | 8 | .6 |
| 8 | 250 | | 250 | 500 | 335 | 172 | 16 | 1.55 |
| 9 | | 250 | 250 | 500 | 300 | 109 | 14 | 1.45 |
| 10 | 750 | | | 750 | 252 | 54 | 8 | .75 |
| 11 | | 750 | | 750 | 188 | 13 | 7 | .7 |
| 12 | | | 750 | 750 | <8 | <5 | <1 | <.1 |
| 13 | 250 | 250 | 250 | 750 | 380 | 124 | 15 | 1.45 |
| 14 | 250 | 500 | | 750 | 180 | 25 | 9 | .75 |
| 15 | 250 | | 500 | 750 | 515 | 314 | 29 | 1.25 |
| 16 | 500 | 250 | | 750 | 210 | 41 | 8 | .75 |
| 17 | 500 | | 250 | 750 | 375 | 135 | 14 | 1.45 |
| 18 | | 250 | 500 | 750 | 482 | 284 | 31 | 1.3 |
| 19 | | 500 | 250 | 750 | 305 | 108 | 15 | 1.55 |
| 20 | 1000 | | | 1000 | 290 | 84 | 7 | <0.25 |
| 21 | | 1000 | | 1000 | 150 | 15 | 7 | <0.25 |
| 22 | | | 1000 | 1000 | 0 | 0 | 0 | 0 |
| 23 | 1500 | | | 1500 | 375 | 125 | 8 | <.25 |
| 24 | | 1500 | | 1500 | 170 | 27 | 9 | <.25 |
| 25 | | | 1500 | 1500 | 0 | 0 | 0 | <.25 |
| 26 | 1000 | | 500 | 1500 | 690 | 352 | 24 | 1.2 |
| 27 | 500 | 500 | 500 | 1500 | 615 | 318 | 25 | 1.0 |
| 28 | | 1000 | 500 | 1500 | 530 | 283 | 24 | .75 |
| 29 | 2000 | | | 2000 | 445 | 164 | 8 | 0.3 |
| 30 | | 2000 | | 2000 | 190 | 32 | 8 | <.25 |
| 31 | 2500 | | | 2500 | 508 | 200 | 9 | .6 |
| 32 | | 2500 | | 2500 | 210 | 50 | 7 | <.25 |
| 33 | 3000 | | | 3000 | 565 | 227 | 14 | .75 |
| 34 | | 3000 | | 3000 | 230 | 62 | 16 | <.25 |
| 35 | | | 3000 | 3000 | 0 | 0 | 0 | 0 |
| 36 | 2500 | | 500 | 3000 | 825 | 400 | 27 | 1.7 |
| 37 | 2000 | 500 | 500 | 3000 | 775 | 375 | 26 | 1.5 |
| 38 | 1500 | 1000 | 500 | 3000 | 720 | 340 | 25 | 1.1 |
| 39 | 1000 | 1500 | 500 | 3000 | 655 | 315 | 27 | 1.1 |
| 40 | 500 | 2000 | 500 | 3000 | 585 | 287 | 27 | .75 |
| 41 | | 2500 | 500 | 3000 | 515 | 262 | 29 | .75 |
| 42 | 4000 | | | 4000 | 648 | 243 | 13 | 2.4 |
| 43 | | 4000 | | 4000 | 280 | 102 | 18 | .75 |
| 44 | | | 4000 | 4000 | 0 | 0 | 0 | 0 |
| 45 | 4500 | | | 4500 | 677 | 322 | 22 | 3.1 |
| 46 | | 4500 | | 4500 | 305 | 125 | 25 | 1.4 |
| 47 | | | 4500 | 4500 | 0 | 0 | 0 | 0 |
| 48 | 4000 | | 500 | 4500 | 885 | 440 | 34 | 3.9 |
| 49 | 3500 | 500 | 500 | 4500 | 860 | 415 | 33 | 3.4 |
| 50 | 3000 | 1000 | 500 | 4500 | 830 | 390 | 32 | 3.2 |
| 51 | 2500 | 1500 | 500 | 4500 | 780 | 365 | 32 | 2.7 |
| 52 | 2000 | 2000 | 500 | 4500 | 730 | 340 | 32 | 2.3 |
| 53 | 1500 | 2500 | 500 | 4500 | 680 | 327 | 33 | 2.2 |
| 54 | 1000 | 3000 | 500 | 4500 | 620 | 295 | 34 | 2.1 |
| 55 | 500 | 3500 | 500 | 4500 | 555 | 276 | 36 | 2.2 |

TABLE I-continued

| Run No. | Additives, ppm A | B | C | Total | LTHA, hrs. 150° C | 160° C | DSC min. | SBT hrs. |
|---|---|---|---|---|---|---|---|---|
| 56 | | 4000 | 500 | 4500 | 440 | 260 | 38 | 2.2 |

The data of Table I clearly demonstrate the synergistic effect had with calcium stearate at any constant total additive level. For instance, at 3000 ppm total additive level (Runs 33–41) comparisons of the test data from runs 36 with those from run 33 show the synergistic improvements in stabilities with calcium stearate in combination with a phenolic antioxidant of the group I type. Similarly, comparisons of run 41 with run 34 data demonstrate the synergistic effect of calcium stearate with a phenolic antioxidant of the group II type, while runs (37–40) further demonstrate the synergism with various mixtures of the group I and group II phenolic antioxidants. Furthermore, comparisons of the latter data with those from run 36 also show the excellent results in stability had with a polyolefin composition stabilized solely with a group I phenolic antioxidant and calcium stearate but in the absence of a hydrazine compound.

It is obvious to those skilled in the art that many variations and modifications can be made to the compositions of this invention. All such departures from the foregoing specification are considered within the scope of this invention as defined by this specification and the appended claims.

What is claimed is:

1. A polyolefin resin composition in direct contact with copper or copper alloys, which composition is stabilized against oxidative degradation with a stabilizer system consisting essentially of:
   (a) a stabilizing amount of at least one phenolic antioxidant selected from mono or polyesters of alkane polyols, at least one of such ester groups comprising the acyl moiety $$HO-\underset{R_2}{\overset{R_1}{\bigcirc}}-(C_xH_{2x})-\overset{O}{\underset{\|}{C}}-$$

in which $R_1$ and $R_2$ independently are a lower alkyl group containing 1 to 5 carbon atoms and $x$ has a value of from 1 to 6, and
   (b) at least 100 ppm of calcium stearate based on the weight of the polyolefin resin.

2. The composition of claim 1 wherein the value of $x$ is 2.

3. The composition of claim 1, wherein $R_1$ and $R_2$ are tertiary alkyls in the 3,5 positions of the phenyl group.

4. The composition of claim 1, wherein the phenolic antioxidant is a polyol fully esterified with the acyl groups.

5. The composition of claim 1, wherein the phenolic oxidant concentration is maintained between about 0.01 to about 10 percent based on the weight of the polyolefin resin and the calcium stearate concentration is maintained between about 100 ppm and about 5000 ppm based on the weight of the polyolefin resin.

6. The composition of claim 1, wherein the polyolefin resin is selected from homopolymers and copolymers of α-olefins having 2 to 8 carbon atoms, and mixtures thereof.

7. The composition of claim 1, wherein the polyolefin resin is a polypropylene resin containing at least 60 percent by weight polymerized propylene groups.

8. The composition of claim 4, wherein the phenolic antioxidant is pentaerythritol tetraester of 3(3,5-di-t-butyl, 4-hydroxy phenyl) propionic acid.

9. The composition of claim 5 wherein the phenolic antioxidant concentration is between about 0.1 and about 1 percent and the calcium stearate concentration is between about 100 and about 500 ppm.

10. The composition of claim 7 wherein the polypropylene resin is an ethylene-propylene polymer resin containing from about 2 to about 25 percent polymerized ethylene.

11. The composition of claim 10, wherein the ethylene-propylene resin is a copolymer containing from about 3 to about 15 percent polymerized ethylene.

* * * * *